United States Patent
Rani et al.

(10) Patent No.: US 8,179,321 B2
(45) Date of Patent: May 15, 2012

(54) CONTEXT SENSITIVE MOBILE DEVICE UTILIZATION TRACKING

(75) Inventors: Ananth Rani, Fremont, CA (US); Sivakumar Venkatraman, San Jose, CA (US)

(73) Assignee: Xora, Inc., Mountain View, CA (US)

( * ) Notice: Subject to any disclaimer, the term of this patent is extended or adjusted under 35 U.S.C. 154(b) by 426 days.

(21) Appl. No.: 12/380,088

(22) Filed: Feb. 24, 2009

(65) Prior Publication Data

US 2009/0213002 A1    Aug. 27, 2009

Related U.S. Application Data

(60) Provisional application No. 61/067,017, filed on Feb. 25, 2008.

(51) Int. Cl.
*G01S 3/02* (2006.01)
*G01S 19/14* (2010.01)

(52) U.S. Cl. .................................. 342/461; 342/357.52
(58) Field of Classification Search ............ 342/357.31, 342/357.4, 357.52, 357.74, 461; 701/213, 701/215
See application file for complete search history.

(56) References Cited

U.S. PATENT DOCUMENTS

| | | | |
|---|---|---|---|
| 6,522,265 B1 * | 2/2003 | Hillman et al. ............... | 340/988 |
| 7,895,013 B2 * | 2/2011 | Dietz et al. .................... | 702/142 |
| 2009/0079555 A1 * | 3/2009 | Aguirre De Carcer et al. ............................. | 340/441 |

* cited by examiner

*Primary Examiner* — Dao Phan
(74) *Attorney, Agent, or Firm* — Moser Taboada

(57) ABSTRACT

A method and apparatus for generating context sensitive mobile device utilization data. The method comprises retrieving mobile device utilization data from a mobile device utilization and tracking device, retrieving location data from the tracking device, retrieving context sensitive data relevant to the device, and analyzing the retrieved data to determine context sensitive mobile device utilization.

13 Claims, 6 Drawing Sheets

CONTEXT SENSITIVE MOBILE DEVICE UTILIZATION TRACKING

CROSS-REFERENCE TO RELATED APPLICATIONS

This application claims benefit of U.S. Provisional Patent Application Ser. No. 61/067,017, filed Feb. 25, 2008, which is herein incorporated by reference.

BACKGROUND OF THE INVENTION

1. Field of the Invention

Embodiments of the present invention generally relate to a method and apparatus for performing context sensitive mobile device utilization tracking.

2. Description of the Related Art

Mobile device use by a driver may significantly impact road safety and may increase employer/guardian liability. Thus, in some cases it would be useful to monitor a driver's mobile device use and report this information to an employer or a guardian. For example, mobile device use by commercial drivers may be monitored by a driver's boss or hiring personnel, a teen-ager's mobile device use while driving may be monitored by a guardian, and the like.

In addition to tracking a driver's mobile device use, it would also be useful to understand the context of the driving conditions during the time the mobile device is in use. For example, a driver using a mobile device while driving at the posted speed limit may pose a much greater hazard if the weather is inclement rather than fair. Thus, it is not only important to monitor mobile device use while driving, but also to correlate mobile device use with the context of the driving conditions.

Therefore, there is a need for a method and apparatus of tracking a driver's mobile device utilization relative to the context of the driver's speed and/or driving conditions.

SUMMARY OF THE INVENTION

Embodiments of the present invention relate to a method and apparatus for performing context sensitive mobile device utilization tracking. The method comprises retrieving mobile device utilization data from a mobile device utilization and tracking device, retrieving location data from the tracking device, retrieving context sensitive data relevant to the device, and analyzing the retrieved data to determine context sensitive mobile device utilization.

The apparatus comprises a mobile device, a mobile device utilization and tracking device, and an analysis device. The mobile device utilization and tracking device tracks the usage of the mobile device. The mobile device utilization and tracking device also tracks location data for the mobile device. The analysis device receives the location data and usage information from the mobile device utilization and tracking device. The analysis device then analyzes the usage data with respect to the location information to generate context sensitive mobile device utilization data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
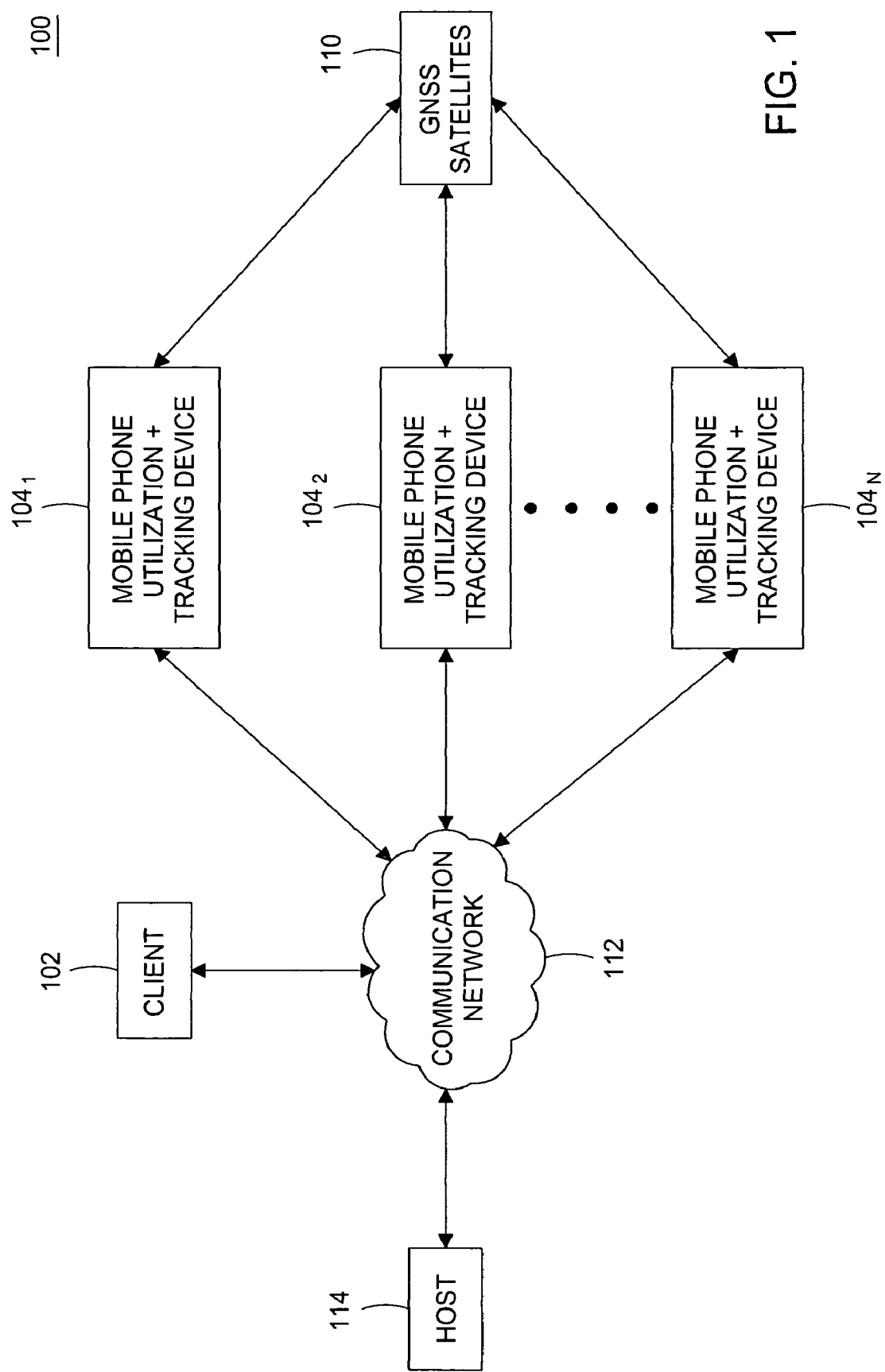
FIG. 1 depicts an exemplary high level overview of a tracking system for context sensitive mobile device utilization tracking.

FIG. 1 depicts an exemplary high level overview of a tracking system 100 for performing context sensitive mobile device utilization tracking. The tracking system 100 includes a client 102, mobile device utilization and tracking devices $104_1, 104_2 \ldots 104_n$ (collectively referred to as mobile device utilization and tracking devices 104), a communication network 112, and a host 114. The system 100 utilizes a network of Global Navigation Satellite System (GNSS) satellites 110 (e.g., Global Positioning System (GPS), Galileo, GLONASS, and the like) to determine the location of the mobile device utilization and tracking devices 104. The client 102 is able to track mobile device utilization related to the mobile device utilization and tracking devices 104. The client 102 is also able to track the position and/or speed of the mobile device utilization and tracking devices 104. In one embodiment, the mobile device utilization and tracking devices 104 are individualized to each driver and/or vehicle where each driver and/or vehicle possesses a cellular phone and personal navigation device (PND), both of which are commercially available. The cellular phone and PND may be integrated into a single device or may be separate devices. The client 102 may be an employer, a government agency, a parent or the like. The client 102 communicates with the host 114 via the communication network 112. The communication network 112 may be a public and/or a private network, such as, the Internet, a local area network, and the like. The communication network 112 may facilitate communications between the mobile device utilization and mobile tracking devices 104, the client 102, and/or the host 114.

Mobile device utilization information is generated by each mobile device utilization and tracking devices 104. Tracking information, such as, time, location, and speed information for the mobile device utilization and tracking devices 104, is computed by each mobile device utilization and tracking device 104 using signals received from the GNSS satellites 110. The mobile device utilization and tracking information, relating to mobile device utilization and tracking devices 104, may be sent to host 114 and/or client 102 via the communication network 110. In one embodiment, the host 114 (e.g., a co-location facility) may host the tracking system 100. It should be noted that while the present invention is described as working with the communication network 112, alternative communication methods may be utilized. Typically, the mobile device utilization and tracking devices 104 communicate by wireless signals with the communication network 112. In one embodiment, the mobile device utilization and tracking devices 104 are cellular telephones comprising GNSS receivers. In another embodiment, the mobile device utilization and tracking devices 104 are purpose built tracking devices and separate cell phones, but having an ability to communicate information to the host 114.

The host 114 and/or the client 102 may archive the mobile device utilization and tracking information. In addition, the host 114 and/or client 102 may calculate and archive the speed of the mobile device utilization and tracking devices 104 of each vehicle and/or driver.

In one embodiment, the system 100 utilizes at least two (2) locations at two (2) different times to calculate the speed of the mobile device utilization and tracking devices 104 by dividing the difference in distance between the two (2) locations by the difference of the two (2) times, wherein each time value relates to the time of the specific location retrieved. The location may be in longitude/latitude, miles, meters, and the like. The host and/or client may utilize the longitude/latitude to calculate the actual distance between the two (2) locations. The location information utilized for calculating the speed may be consecutive locations of the mobile device utilization and tracking device. In other embodiments, the mobile device utilization and tracking devices 104 compute the device's speed from the GNSS signals and transmits the speed to the host 114 and/or client 102.

In one embodiment, the tracking system 100 correlates mobile device utilization, actual vehicle travel speeds, and legal and basic speed limits to determine a contextual safety analysis. For example, the host 114 compares the calculated speed with the legal speed limit posted in the location of the mobile device utilization and tracking devices 104. The host 114 correlates mobile device utilization, calculated speed of the vehicle, and the legal speed limit of the route of the vehicle. The legal speed limit may be retrieved from a third party via the communication network 112 or may be archived in a database on the host 114. In another embodiment, the tracking system 100 compares the mobile device utilization and calculated speed against prevailing environmental conditions and/or route specific limitations, such as location of the street traveled, weather conditions, zoning limitations, and other contextual information. As such, the driver's mobile device utilization can be analyzed in view of the context of the external metrics representing the driving route and conditions. Thus, the system 100 analyzes a context sensitive mobile device utilization of the mobile device utilization and mobile tracking device 104.

In addition, the tracking system 100 can identify when a driver's speed exceeds a given threshold while using a mobile device. For example, if the driver is using a mobile device, or any communication device, the host 114 compares the calculated speed to a threshold speed limit. The threshold speed may be predetermined or may be set dynamically based on the location of the mobile device utilization and tracking devices 104 and/or the prevailing or expected environmental conditions, such as location of the street traveled, weather conditions, zoning limitations, and other contextual information. The context information used to determine the threshold speed may also include driver specific information and/or history. If the driver is utilizing a mobile device or communication device and the driver's speed exceeds the threshold speed, the driver's driving is determined/flagged to be unsafe.

In one embodiment, context information relevant to the use of the mobile device utilization and tracking devices 104, such as calculated speed, location, legal speed limit, local weather and/or traffic report, may be electronically delivered to the client 102 via web, email, or the like. In another embodiment, the client 102 may retrieve such information by accessing the host 114 via the network 112. The vehicle related information may include historical information, analysis report, or the like.

The tracking system 100 may be utilized for proactively identifying high-risk drivers, increasing fuel efficiency, decrease fuel costs, gaining context for infractions versus simple violation, improving fleet longevity, decreasing vehicle wear, growing profitability, decreasing insurance premiums, gaining broad use with easy user-interface, rewarding responsible driving, monitoring irresponsible driving, model best behavior benchmarks, and the like.

Figure 2:
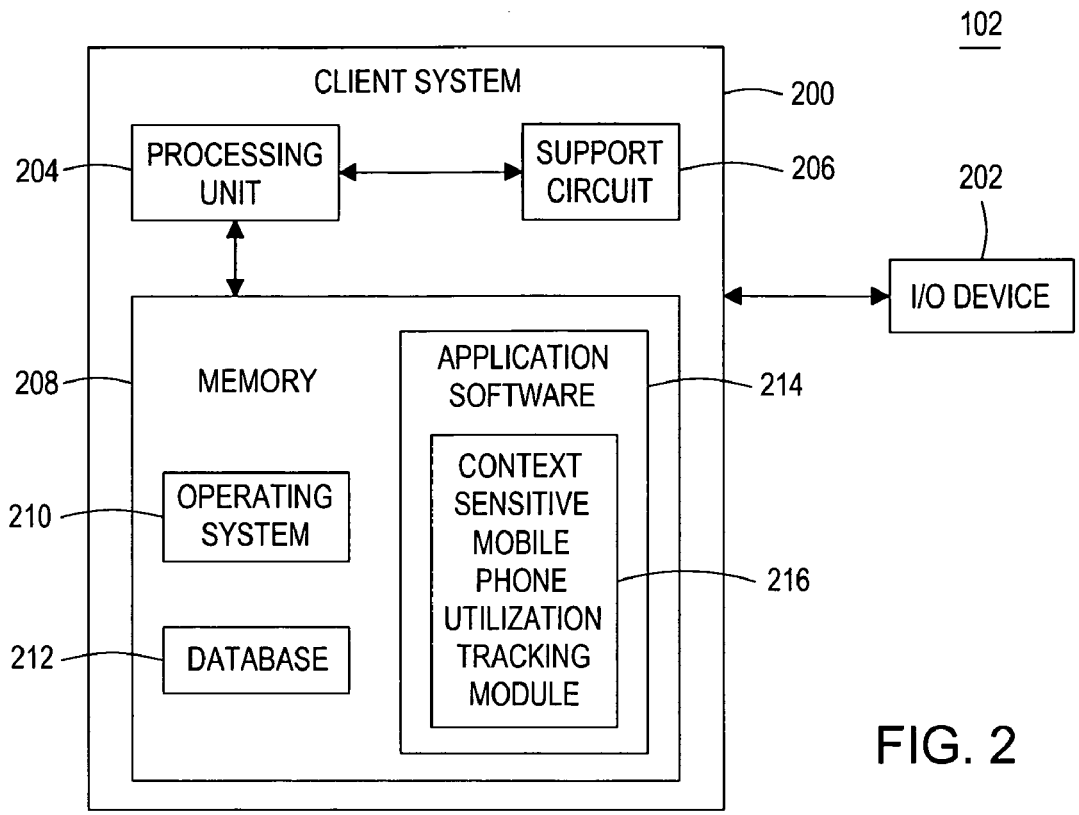
FIG. 2 depicts a block diagram of an exemplary overview of a client of FIG. 1.

FIG. 2 depicts a block diagram of an exemplary overview of a client 102 of FIG. 1. The client 102 comprises a client system 200 and input/output (I/O) devices 202. The client system 200 may communicate with the I/O devices 202, such as, a monitor, printer, communication device, and the like. The client system 200 comprises at least one processing unit 204, support circuits 206, and a memory 208. The processing unit 204 may comprise one or more conventionally available microprocessors. The support circuits 206 are well known circuits used to promote functionality of the processing unit 204. Such circuits include, but are not limited to, a cache, power supplies, clock circuits, I/O circuits and the like.

The memory 208 of the client system 200 may comprise random access memory, read only memory, removable disk memory, flash memory, and various combinations of these types of memory. The memory 208 is sometimes referred to as main memory and may, in part, be used as cache memory or buffer memory. The memory 208 generally stores the operating system 210 of the client system 200. The operating system 210 may be one of a number of commercially available operating systems such as, but not limited to, SOLARIS from SUN Microsystems, Inc., AIX from IBM Inc., HP-UX from Hewlett Packard Corporation, LINUX from Red Hat Software, Windows 2000 from Microsoft Corporation, and the like.

In addition, the memory 208 may store database 212, and various forms of application software 214, such context sensitive mobile device utilization tracking module 216. The database 212 may comprise a relational database, for example, Oracle from Oracle Corporation. The data in the database 212 may be accessible by the host 114. The data in the database 212 may be any data used by the operating system 210 or the application software 214. The context sensitive mobile device utilization tracking module 216 may utilize the tracking information from the mobile device utilization and mobile tracking devices 104 via the communication network 112 for determining mobile device utilization and/or speed of the vehicle or driver associated with a specific mobile device utilization and tracking device 104. The context sensitive mobile device utilization tracking module 216 may archive the mobile device utilization and/or speed data in the database 212. In other embodiments, the context sensitive mobile device utilization information may be accessed via a web portal using a web browser. In such an alternative, the context sensitive mobile device utilization tracking module 216 would not be used in the client 200.

To support the operation and functionality of the present invention, the memory 208 may be partially used as cache memory to temporarily store cached information. The context sensitive mobile device utilization tracking module 216 may utilize the memory 208 for system functions, such as, storing, viewing, editing, and the like.

Figure 3:
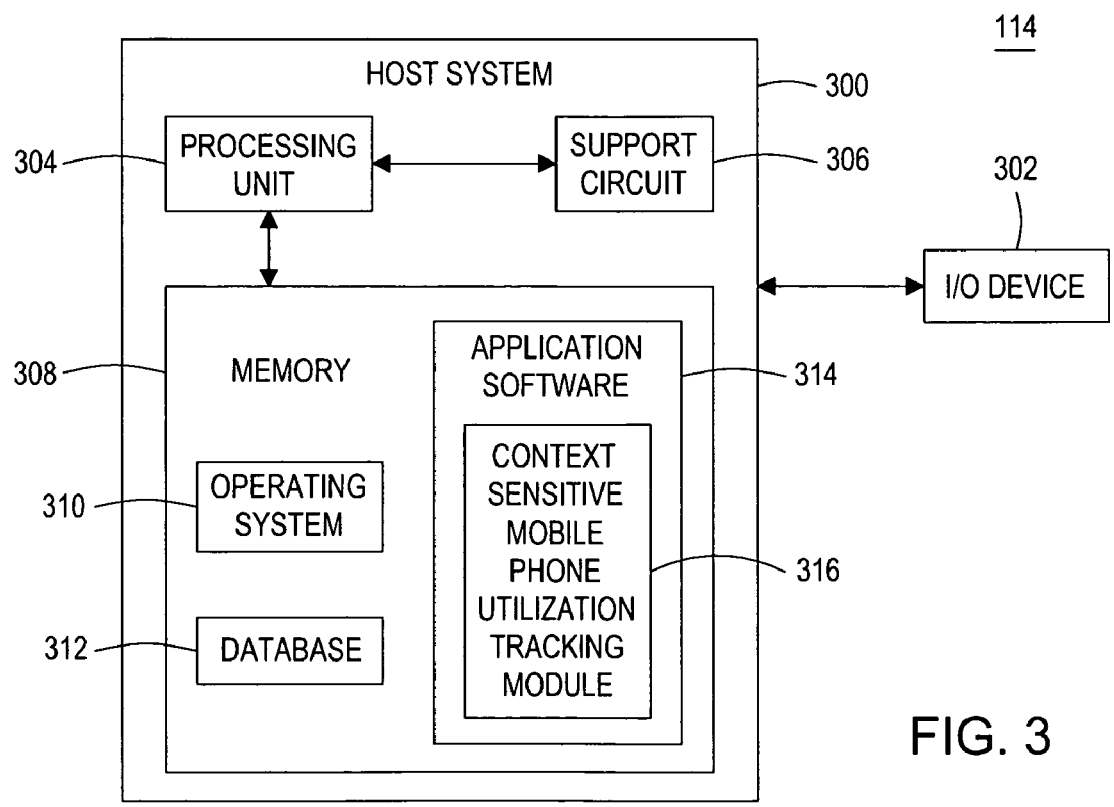
FIG. 3 depicts a block diagram of an exemplary overview of a host of FIG. 1.

FIG. 3 depicts a block diagram of an exemplary overview of a host 114 of FIG. 1. The host 114 comprises a host system 300 and input/output (I/O) device 302. The host system 300 may communicate with the I/O device 302, such as, a monitor, printer, communication device, and the like. The host system 300 comprises at least one processing unit 304, support circuits 306, and a memory 308. The processing unit 304 may comprise one or more conventionally available microprocessors. The support circuits 306 are well known circuits used to promote functionality of the processing unit 304. Such circuits include, but are not limited to, a cache, power supplies, clock circuits, input/output (I/O) circuits and the like.

The memory 308 of the host system 300 may comprise random access memory, read only memory, removable disk memory, flash memory, and various combinations of these types of memory. The memory 308 is sometimes referred to main memory and may, in part, be used as cache memory or buffer memory. The memory 308 generally stores the operating system 310 of the client system 300. The operating system 310 may be one of a number of commercially available operating systems such as, but not limited to, SOLARIS from SUN Microsystems, Inc., AIX from IBM Inc., HP-UX from Hewlett Packard Corporation, LINUX from Red Hat Software, Windows 2000 from Microsoft Corporation, and the like.

In addition, the memory 308 may store database 312 and various forms of application software 314, such as context sensitive mobile device utilization tracking module 316. The database 312 may comprise a relational database, for example, Oracle from Oracle Corporation. The data of the database 312 may be any data used by the operating system 310 or the application software 314. The context sensitive mobile device utilization tracking module 316 may utilize the tracking information from the mobile device utilization and tracking devices 104 via the communication network 112 for determining mobile device utilization and/or speed of the vehicle or driver associated with a specific mobile device utilization and tracking device 104. The context sensitive mobile device utilization tracking module 316 may archive the mobile device utilization, tracking information and/or context in the database 312. The data in the database 312 may be accessible by the client 102 through a web portal, FTP site, e-mail, or other means of data communication. The database 312 includes data utilized for calculating and/or analyzing mobile device utilization and context information (i.e., weather, school zones, time of day, traffic information, speed, construction information, and the like) as well as maps, routes, driver's driving records and the like.

To support the operation and functionality of the present invention, the memory 308 may be partially used as cache memory to temporarily store cached information. The context sensitive mobile device utilization tracking module 316 may utilize the memory 308 for system functions, such as, storing, viewing, editing, and the like.

Figure 4:
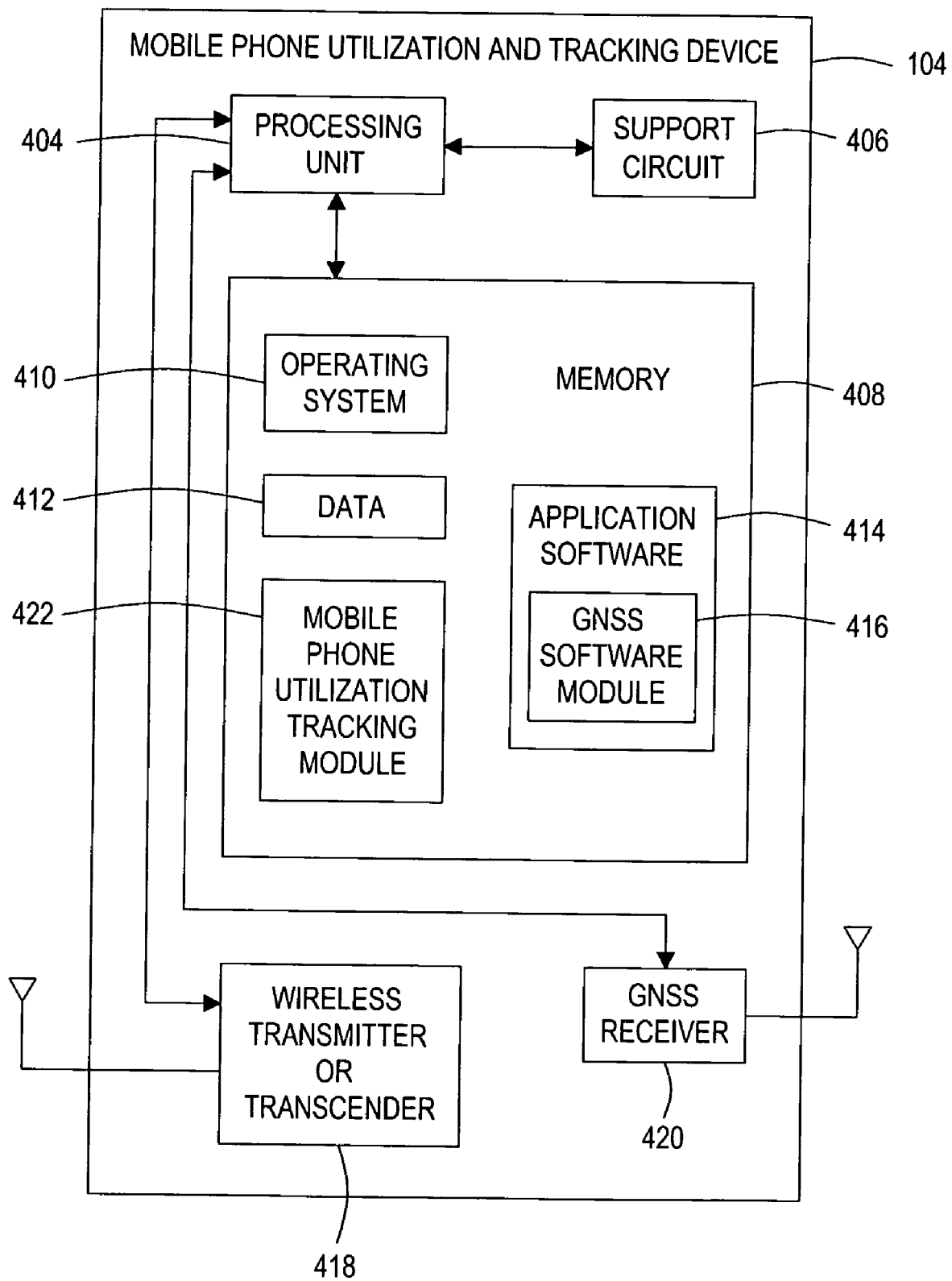
FIG. 4 depicts a block diagram of an exemplary overview of a mobile device utilization and tracking device of FIG. 1.

FIG. 4 depicts a block diagram of an exemplary overview of the mobile device utilization and tracking devices 104 of FIG. 1. The mobile device utilization and tracking device 104 comprises at least one central processing unit 404, support circuits 406, a memory 408, a wireless transmitter or transceiver 418, and a GNSS receiver 420. The processing unit 404 may comprise one or more conventionally available microprocessors. The support circuits 406 are well known circuits used to promote functionality of the processing unit 404. Such circuits include, but are not limited to, a cache, power supplies, clock circuits, input/output (I/O) circuits and the like.

The memory 408 of the mobile device utilization and mobile tracking device 104 may comprise random access memory, read only memory, removable disk memory, flash memory, and various combinations of these types of memory. The memory 408 is sometimes referred to main memory and may, in part, be used as cache memory or buffer memory. The memory 408 generally stores an operating system 410 of the mobile device utilization and tracking device 104.

In addition, the memory 408 may also store data 412 and various forms of application software 414, such as GNSS software module 416 and mobile device utilization tracking module 422. The GNSS software module 416 operates in conjunction with the GNSS receiver 420 to compute location information and/or speed in a conventional manner. The location information, mobile device utilization information, and/or context information is sent to the host 114 (shown in FIG. 1) via the wireless transmitter or transceiver 418. Such information may include the time/date the mobile device utilization and tracking devices 104 received the data via the GNSS receiver 420 and/or the time/date the mobile device utilization and tracking devices 104 transmitted the data via the wireless transmitter or transceiver 418. As such, the time/date information may be used by the host 114 to analyze the context information at the time and in the location relevant to the mobile device utilization and tracking devices 104.

The mobile device utilization tracking module 422 tracks the utilization of a mobile device as the mobile device is utilized in the monitored vehicle and/or by a specific user. The mobile device utilization tracking module 422 may communicate with a module in the mobile device being tracked and/or may use sensors, or the like, to determine that the mobile device is being used.

For example, in one embodiment the mobile device utilization tracking module 422 may detect that the mobile device is in use by receiving a message (or flag) from the mobile device indicating that the mobile device is in use mode. In another embodiment, the mobile device utilization module 422 may detect that the mobile device is in use by detecting communication signals transmitted by the mobile device. The mobile device utilization tracking module 422 then archives relevant data in relation to the mobile device utilization, such as location, time and date, speed, and the like.

To support the operation and functionality of the present invention, the memory 408 may be partially used as cache memory to temporarily store cached information. The GNSS software module 416 and mobile device utilization tracking module 422 may utilize the memory 408 for system functions, such as, storing, viewing, editing, and the like.

Figure 5:
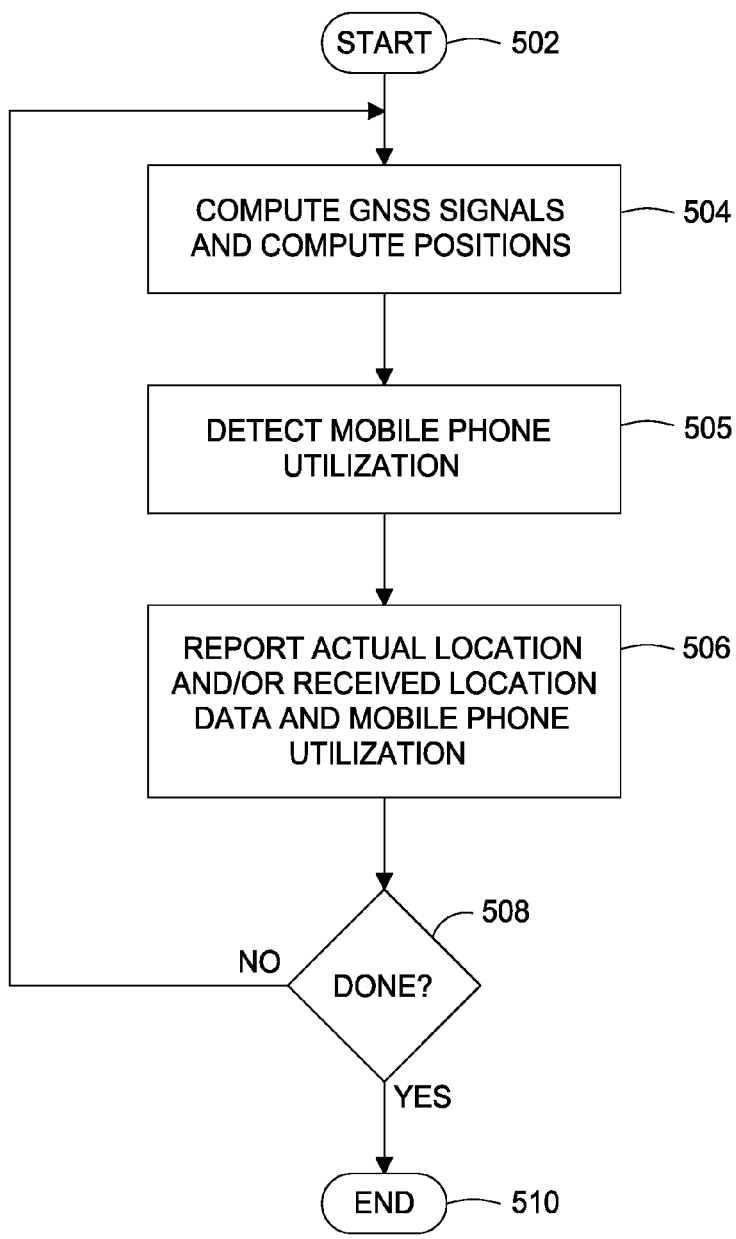
FIG. 5 depicts an exemplary overview of a method of operation of a mobile device utilization and tracking device used for context sensitive mobile device utilization tracking.

FIG. 5 depicts an exemplary overview of a method 500 of operation of a mobile device utilization and tracking device used for context sensitive mobile device utilization tracking. The method 500 starts at step 502 and proceeds to step 504. At step 504, the mobile device utilization and tracking device receives GNSS satellite signals and computes position. At step 505, the mobile device utilization and tracking device detects and monitors the mobile device utilization. At step 506, the mobile device utilization and tracking device reports mobile device utilization and the computed location, speed and/or any other context information relative to the mobile device use to the host. At step 508, the method 500 queries whether the process is completed. If the process is not completed, the method 500 proceeds from step 508 to step 504. If the process is completed, the method 500 proceeds from step 508 to step 510. At step 510, the method 500 ends. This method may be executed upon detection of mobile device utilization; thus context information would only be transmitted to the host during use of the mobile device. In other embodiments, the mobile device utilization and context information may be stored locally and sent periodically through periodic execution of method 500.

Figure 6:
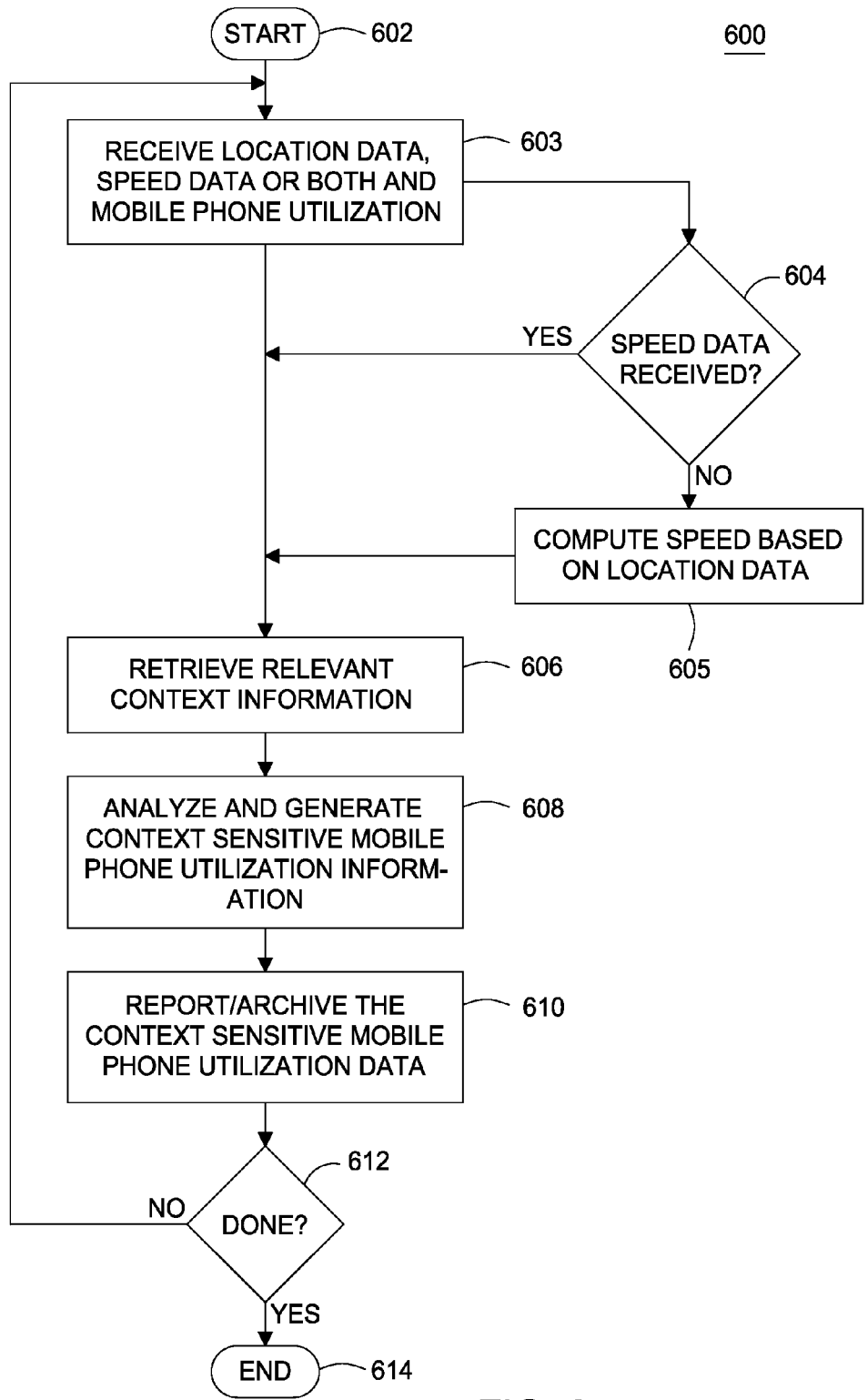
FIG. 6 depicts an exemplary overview of a method of operation of a host used for context sensitive mobile device utilization tracking.

FIG. 6 depicts an exemplary overview of a method 600 of operation of a host used for context sensitive mobile device utilization tracking. The method 600 starts at step 602 and proceeds to step 603. At step 603, the host receives mobile device utilization data and other context information (e.g., location, speed and the like) from the mobile device utilization and tracking device. If the host only receives the location information, the method proceeds to step 605 and the host may optionally compute the speed of the mobile device utilization and tracking device from the received location information. Thus, the speed of the mobile device utilization and tracking device may be calculated by the mobile device utilization and tracking device or the host. If speed is a form of context information that is not to be used, then steps 604 and 605 can be skipped.

At step 606, the host retrieves any additional relevant context information that corresponds to the location of the device. At step 608, the host analyzes the mobile device utilization data and the context information and generates context sensitive mobile device utilization data. The context sensitive mobile device utilization data provides information on periods of mobile device use while driving, taking into account the surrounding factors such as driving speed, school zones, weather factors, road construction, and the like. In one embodiment, the host may compare the mobile device utilization data, speed of the mobile device utilization and tracking device, and the retrieved context information. The host may then report the suitability of the driving speed during periods of mobile device use. In another embodiment, the host may compute a safe-speed threshold and may report both the actual driving speed and the safe-speed threshold to determine the suitability of the driving speed during periods of mobile device use. At step 610, the host reports and/or archives the context sensitive mobile device utilization data. At step 612, the method 600 queries whether the process is completed. If the process is not completed, the method 600 proceeds from step 612 to step 603. If the process is completed, the method 600 proceeds from step 612 to step 614. At step 614, the method 600 ends.

Figure 7:
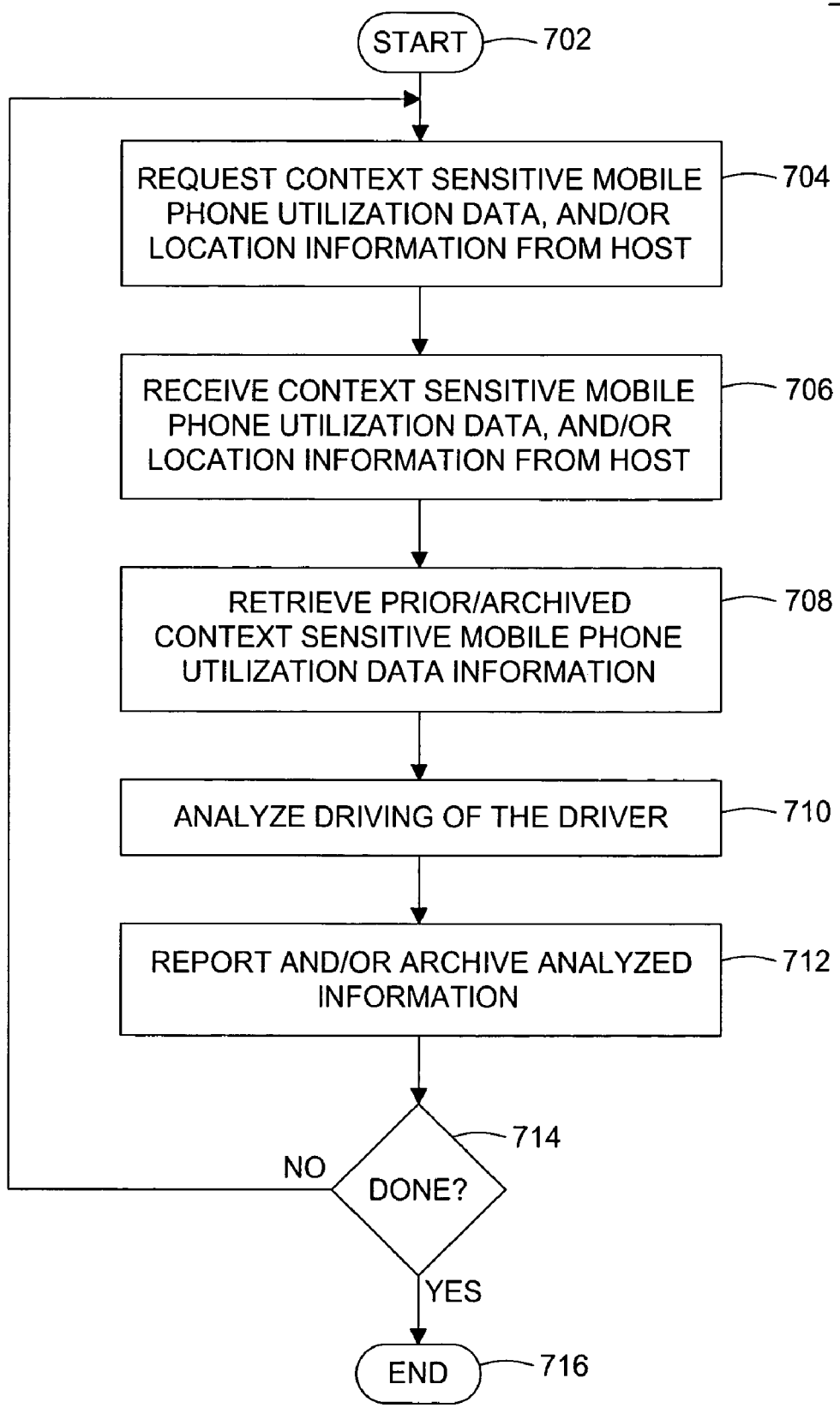
FIG. 7 depicts an exemplary overview of a method of operation of a client used for context sensitive mobile device utilization tracking.

FIG. 7 depicts an exemplary overview of a method 700 of operation of a client used for context sensitive mobile device utilization tracking. The method 700 starts at step 702 and proceeds to step 704. At step 704, the client requests context sensitive mobile device utilization data and/or location information from the host. At step 706, the client receives context sensitive mobile device utilization data and/or location information. At step 708, the client retrieves prior/archived context sensitive mobile device utilization data. At step 710, the client analyzes the context sensitive mobile device utilization data of the driver of the relevant mobile device utilization and tracking device. This analysis can also be performed in the host and sent to the client as a report, or accessed by the client as a report via a web portal. At step 712, the client reports and/or archives analyzed information. At step 714, the method 700 queries whether the process is completed. If the process is not completed, the method 700 proceeds from step 714 to step 704. If the process is completed, the method 700 proceeds from step 714 to step 716. At step 716, the method 700 ends.

While the foregoing is directed to embodiments of the present invention, other and further embodiments of the invention may be devised without departing from the basic scope thereof.

What is claimed is:

1. A method for performing context sensitive mobile device utilization tracking comprising:
    retrieving mobile device utilization data from a mobile device utilization and tracking device;
    retrieving location data from the mobile device utilization and tracking device; and
    performing analysis on the retrieved utilization and location data to generate a set of context sensitive mobile device utilization data, wherein performing the analysis comprises (i) comparing the utilization and location data with external metrics; (ii) determining a recommended safe driving speed based on the external metrics; and (iii) comparing a speed of the mobile device with the recommended safe driving speed.

2. The method of claim 1 further comprising:
    computing the location data on a mobile device; and
    sending the location data to the mobile device utilization and tracking device.

3. The method of claim 2 wherein the location data is computed from GNSS signals received by the mobile device.

4. The method of claim 2 where the mobile device computes the current speed of the device from the change in location information over time.

5. The method of claim 4 wherein the location data sent to the mobile device utilization and tracking device comprises the speed of the mobile device.

6. The method of claim 1 wherein the mobile device utilization and tracking device calculates the speed of a mobile device based on the location information received.

7. The method of claim 1 wherein the external metrics are chosen from a list comprising the speed limit, the weather conditions, construction zones, and zoning restrictions.

8. An apparatus for providing context sensitive utilization tracking comprising:
    a mobile device utilization and tracking device for receiving location and utilization data; and
    an analysis device for analyzing the location and utilization data and generating context sensitive utilization data, wherein analyzing the location and utilization data comprises (i) comparing the utilization and location data with external metrics; (ii) determining a recommended safe driving speed based on the external metrics; and (iii) comparing a speed of the mobile device with the recommended safe driving speed.

9. The apparatus of claim 8 further comprising a mobile device for generating the location and utilization data and transmitting the data to the mobile device utilization and tracking device.

10. The apparatus of claim 9 wherein the location data is computed by analysis of GNSS signals received by the mobile device.

11. The apparatus of claim 10 wherein the location information computes the speed of the device from the change in location information over time.

12. The apparatus of claim 8 wherein the analysis device generates context sensitive utilization data by comparing the location and utilization data to external metrics.

13. The apparatus of claim 12 wherein the external metrics are selected from a list comprising one or more of: the speed limit at the location of the device, weather conditions, construction zones, and zoning restrictions.

* * * * *